United States Patent

[11] 3,585,371

[72] Inventor Edward Camp Dowling
Harrisburg, Pa.
[21] Appl. No. 849,568
[22] Filed July 25, 1969
[45] Patented June 15, 1971
[73] Assignee AMP Incorporated
Harrisburg, Pa.
Continuation of application Ser. No. 428,053, Jan. 26, 1965, now abandoned.

[54] CONTROLLED SEQUENCE PROGRAMMING MEANS

4 Claims, 3 Drawing Figs.

[52] U.S. Cl. .......... 235/92CT, 340/348, 178/79, 235/92 SH, 235/92 DE, 235/92 R
[51] Int. Cl. .......... H03k 3/82
[50] Field of Search .......... 178/79; 340/348; 235/92, 68, 37, 52; 307/221; 328/37

[56] References Cited

UNITED STATES PATENTS

| | | | |
|---|---|---|---|
| 3,230,514 | 1/1966 | Kliman .......... | 235/92 X |
| 2,832,951 | 4/1958 | Browne, Jr. .......... | 340/348 |
| 3,300,582 | 1/1967 | Himes et al. .......... | 178/79 |

*Primary Examiner*—Thomas A. Robinson
*Assistant Examiner*—Joseph M. Thesz, Jr.
*Attorneys*—Curtis, Morris & Safford, Marshall M. Holcombe, William Hintze, William J. Keating, Frederick W. Raring, John R. Hopkins and Adrian J. LaRue

ABSTRACT: A programming means comprises a magnetic shift register to which is applied a selected frequency of pulses, a diode pinboard or card reader is connected to the output of the shift register and diode pins are inserted into the diode pinboards at selected positions or a card reader having desired information thereof selects pulses from the train of pulses emanating from the shift register to provide a desired repetitive output of pulses for the testing and evaluation of complex sequential digital systems and other applications.

PATENTED JUN 1 5 1971

3,585,371

INVENTOR.

EDWARD CAMP DOWLING

Curtis, Morris & Safford

INVENTOR.

EDWARD CAMP DOWLING

Curtis, Morris & Safford

CONTROLLED SEQUENCE PROGRAMMING MEANS

This application is a continuation of my prior copending application, Ser. No. 428,053, filed Jan. 26, 1965 and now abandoned.

This invention relates to programming means and more particularly to controlled sequence programming means.

In various fields, such as, for example, testing and evaluation of complex sequential digital systems, sequential generation of stimuli in biomedical electronics, step-by-step acceptance testing of digital logic modules, generation of command signals for automatic control systems and generation of binary words, there has been a need for a general purpose controlled sequence programming means having versatile programming capability.

It is, therefore, a primary object of the present invention to provide programming means for generating a controlled sequence of pulses.

A further object of the present invention is to provide a controlled sequence programming means having versatile programming capability.

An additional object of the present invention is to provide a programming means that has various modes of operation.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

In the Drawings;

FIG. 3 is an embodiment of FIG. 1.

Figure 1:
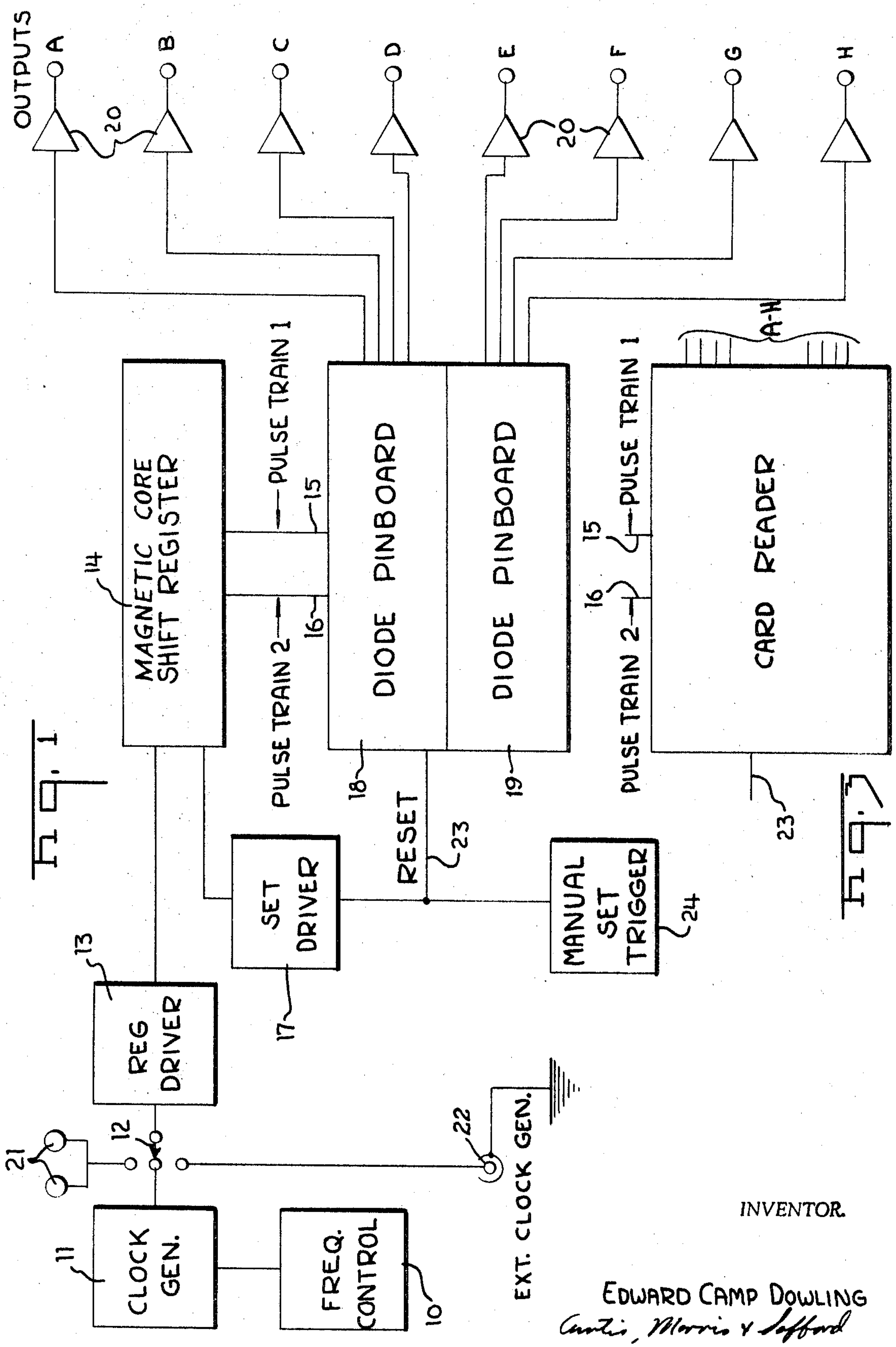
FIG. 1 is a block diagram of the programming means, object of the present invention.

Turning now to the drawings and more particularly FIG. 1, 10 is a frequency-control circuit which preferably comprises a precision 10-turn potentiometer that allows the frequency to be directly selected. Frequency-control circuit 10 is connected to a conventional clock generator 11. Frequency-control circuit 10 controls the output pulses generated by clock generator 11.

The output of clock generator 11 is connected via selector switch 12 to register driver circuit 13, which may be of the type disclosed in U.S. Pat. No. 3,154,693. The output of register driver circuit 13 is connected to a shift register 14, which is an N-bit shift register; a two-core-per-bit, two-phase shift register using magnetic cores of the MAD type and wire only. Shift register 14 is of the type disclosed in U.S. Pat. No. 2,995,731. Each odd core of the shift register has an output winding on the major aperture thereof and the output from the odd cores are located in an output means 15 and identified as pulse train 1. Likewise, each even core has an output winding on its major aperture and is located in output means 16, identified as pulse train 2.

A conventional set driver 17 is connected to shift register 14 in order to clear the cores therein and to set the first odd core with information. Output means 15 and 16 are respectively connected to diode pinboards 18 and 19, which are of conventional design. Each odd core in shift register 14 has its output winding connected directly to its associated position of diode pinboard 18 via output means 15 and each even core has its output winding connected directly to its associated position of diode pinboard 19 via output means 16. Thus, the number of longitudinal holes in diode pinboards 18 and 19 corresponds to the number of cores in the even and odd disposition of cores in shift register 14, for example, if there are 50 odd cores and 50 even cores in shift register 14, there will be 50 longitudinal holes disposed in each diode pinboard representing a single output from each of the pinboards.

For each output A—H emanating from pinboards 18 and 19, there is a longitudinal row of contact members lined with respective holes to receive the diode member. Thus, outputs A—D are connected to respective longitudinal rows of contacts in pinboard 18, while outputs E—H are connected to respective longitudinal rows of contacts in pinboard 19. Amplifier means 20 are connected to respective outputs A—H in order to amplify the outputs from pinboards 18 and 19 to a desired level.

With selector switch 12 in the position illustrated in FIG. 1, the operational mode of the system hereinabove described is termed an automatic mode providing repetitive operation and selected pulse discrimination at outputs A—H. A manual mode of operation is obtained by connecting selector switch 12 to pushbutton means 21, which allows each step of the program to be initiated at will. Pushbutton means 21 are provided for ultimate operation so that the stepping sequence can be manually controlled. One pushbutton means 21 controls the operation of the even cores in shift register 14, while the other pushbutton means controls the odd cores in the shift register.

An external clock mode may be utilized by connecting an external clock generator (not shown) to an input jack 22, which, in turn, is connected to selector switch 12. The external clock mode functions precisely the same as the automatic mode with the exception that clock generator 11 is disconnected from register driver 13 and register driver 13 is connected to input jack 22 via selector switch 12, thereby allowing an external source to determine the clock frequency.

A horizontal alignment of contacts is disposed in one of the pinboards, which is preferably pinboard 18, and these contacts are in alignment with corresponding holes in which diode pins are to be inserted. A reset lead 23 is connected to these contacts and is, in turn, connected to set driver circuit 17. A diode pin can be inserted in any of the openings associated with reset lead 23 in order to provide the repetitive operation in the automatic mode.

The position of a diode pin in any of the reset openings is defined as a cycle pin, and this determines the length of the program; it may be placed in any of the positions along the longitudinal line of reset openings. For example, with the cycle pin inserted into position 10, the program will step through positions 1—10 and then recycle to position 1. Any cycle pins placed in positions subsequent to position 10 will be ignored.

If no cycle pin is placed in any of the reset openings, a single frame mode of operation occurs which allows one complete program to be generated starting with position 1 and ending with the last core in shift register 14. In order to initiate another single frame mode of operation, manual set trigger 24, which comprises a pushbutton, is operated and manual set trigger is connected to set driver circuit 17 to operate same.

Figure 2:
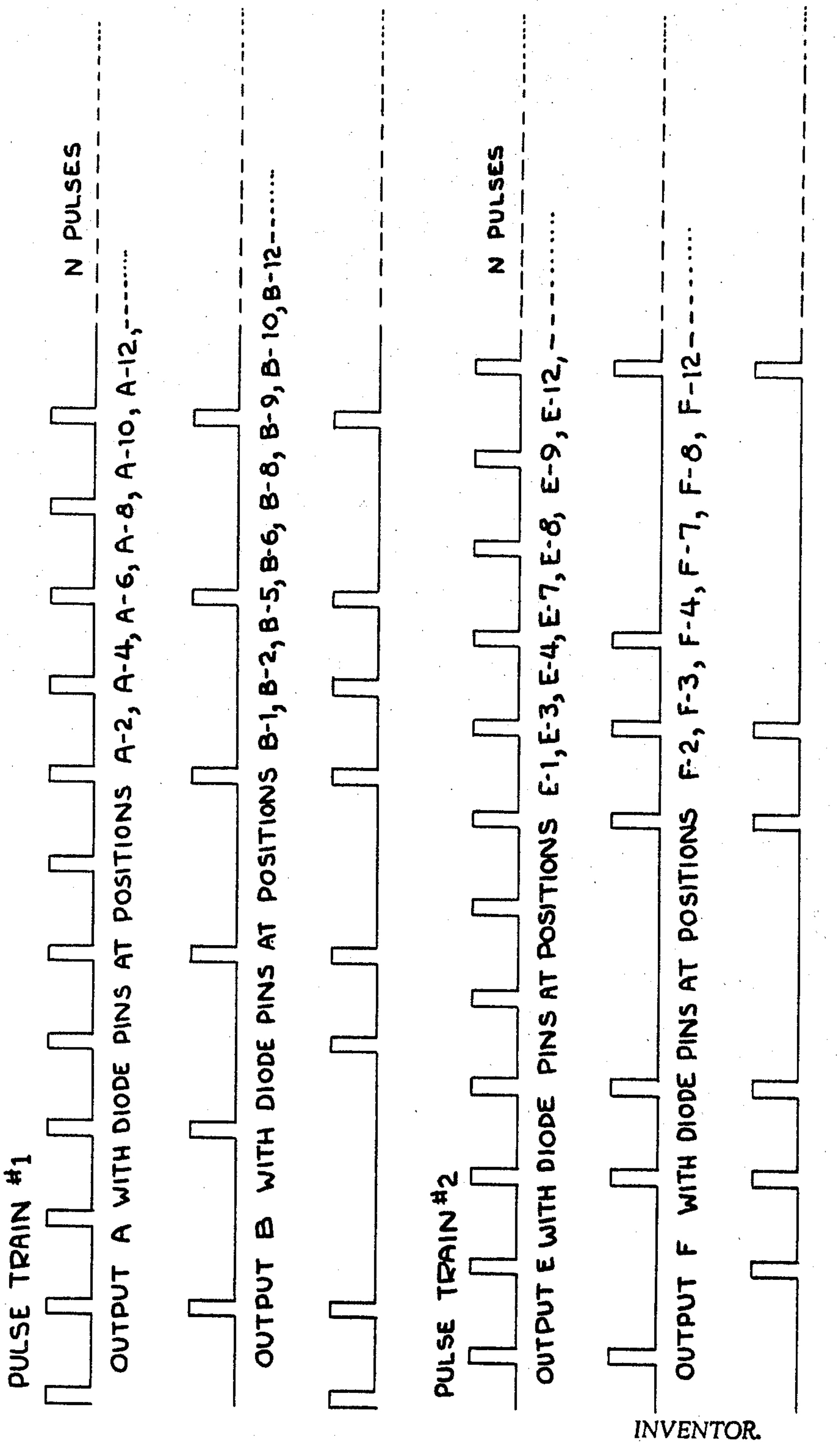
FIG. 2 is a diagrammatic representation of pulse trains and selectable outputs thereof.

The operation of the system of FIG. 1 with selector switch 12 in the position shown therein is according to the following: A single "one" is inserted into shift register 14 by set driver circuit 17. The "one" is shifted down the register at the rate set by frequency-control circuit 10 and clock generator 11. As the "one" is shifted into each core, a voltage is induced on the output circuit of that core. Thus, two trains of end pulses are generated; one by the N-number of odd cores of the shift register, the other by the N-number of even cores thereof. Pulse train 1 and pulse train 2 are illustrated in FIG. 2. Output channels A—D are energized at shift 0 time of the clock generator and register driver circuits. O channels E—H are energized at shift E time of the clock generator and register driver circuits. Connecting the outputs of one channel of outputs A—D and one channel of outputs E—H into a conventional OR circuit will provide a 2N-number of pulses, thereby doubling the program capability.

By plugging diode pins into the appropriate pinboard positions, only the selected pulses will be transmitted into amplifiers 20 for each specific output channel. For example, if diode pins are placed into position A–2, A–4, A–6, A–8, A–10 and A–12, the second, fourth, sixth, eighth, 10th and 12th pulses of channel A will appear at output A. The output pulses of channel A with the diode pins in the positions, as set forth hereinabove, is illustrated in FIG. 2. Similar outputs in channels B, E and F with an indication of the diode pin positions, are also illustrated in FIG. 2.

Instead of using pinboards 18 and 19, as illustrated in FIG. 1, a card reader of the type disclosed in Pat. Ser. No. 296,812, filed Aug. 22, 1963, and assigned to the present assignee, which is diagrammatically illustrated in FIG. 3, may be substituted for diode pinboards 18 and 19. Thus, output means 15 and 16, as well as reset leads 23, will be appropriately connected to the contact means in the card reader to provide output pulses at outputs A—H, in accordance with the code set forth in punched cards to be read by the card reader. Thus, the punched card takes the place of the diode pins in order to set forth desired pulse outputs to be taken from outputs A—H. While there has been set forth a particular type of card reader, it is obvious that other conventional card readers may be utilized. This is also true with respect to the other circuitry set forth hereinabove since other suitable conventional circuitry can be utilized in place of the disclosed publications.

Thus, as can be discerned, there has been disclosed a unique system producing versatile and convenient programming for a wide range of digital applications.

It will, therefore, be appreciated that the aforementioned and other desirable objects have been achieved; however, it should be emphasized that the particular embodiment of the invention, which is shown and described herein, is intended as merely illustrative and not as restrictive of the invention.

I claim:

1. A controlled sequence generator comprising shift register means, means connected to said shift register means to supply information thereto, means connected to said shift register means to shift said information along said shift register means and to provide output information therefrom, means connected to said shift register means to selectively receive and transmit predetermined portions of said output information, and output means connected to the last-mentioned means to transmit the selected information, wherein said receiving and selecting means comprises pinboard means, wherein said pinboard means includes means to set the repetition rate at which said information occurs in said shift register means.

2. A controlled sequence generator comprising generating means for generating a predetermined frequency, driver means connected to said generating means for providing advance pulses in accordance with said predetermined frequency, shift register means connected to said driver means, information-imparting means connected to said shift register means to impart information thereto, said driver means being adapted to shift said information along said shift register means, information-receiving means connected to said shift register means for receiving said information therefrom, and means in said information-receiving means to selectively receive and transmit predetermined portions of said information, wherein said information-receiving means comprises pinboard means, wherein said pinboard means includes means to set the repetition rate at which said information occurs in said shift register means.

3. In a controlled sequence generator for supplying random information, generating means for generating a predetermined frequency, driver means connected to said generating means for generating advance pulses in accordance with said predetermined frequency, shift register means having magnetic core means connected to said driver means, information-imparting means connected to said magnetic core means for imparting information thereto, said driver means being adapted to shift information imparted to said magnetic core means along said magnetic core means, output means on said magnetic core means in which said information appears, pinboard means connected to said output means, and means for inclusion in said pinboard means to selectively receive and transmit predetermined portions of said information appearing in said output means, wherein said pinboard means includes means to set the repetition rate at which said information occurs in said shift register means.

4. In a controlled sequence generator for supplying random information, generating means for generating a predetermined frequency, driver means connected to said generating means for generating advance pulses in accordance with said predetermined frequency, shift register means having magnetic core means connected to said driver means, information-imparting means connected to said magnetic core means for imparting information thereto, said driver means being adapted to shift information imparted to said magnetic core means along said magnetic core means, output means on said magnetic core means in which said information appears, card reader means connected to said output means, and means for inclusion in said card reader means to selectively receive and transmit predetermined portions of said information appearing in said output means, wherein said card reader means includes means to set the repetition rate at which said information occurs in said shift register means.